(12) United States Patent
Kaneiwa

(10) Patent No.: US 8,480,007 B2
(45) Date of Patent: Jul. 9, 2013

(54) FORCED DRAFT DIRECT VENT TYPE ROOM HEATER

(75) Inventor: Satoshi Kaneiwa, Nagoya (JP)

(73) Assignee: Rinnai Corporation, Nagoya-shi (JP)

( * ) Notice: Subject to any disclaimer, the term of this patent is extended or adjusted under 35 U.S.C. 154(b) by 940 days.

(21) Appl. No.: 12/577,332

(22) Filed: Oct. 12, 2009

(65) Prior Publication Data
US 2010/0025485 A1     Feb. 4, 2010

(30) Foreign Application Priority Data
Jul. 8, 2008   (JP) ................................. 2008-177601

(51) Int. Cl.
*F24D 5/00*   (2006.01)

(52) U.S. Cl.
USPC .......................................................... 237/53

(58) Field of Classification Search
USPC .......................................................... 237/53
See application file for complete search history.

(56) References Cited

U.S. PATENT DOCUMENTS

| | | | |
|---|---|---|---|
| 1,743,362 A * | 1/1930 | Lindsay ...................... 237/78 R |
| 4,276,929 A * | 7/1981 | Howard ........................... 237/55 |
| 4,444,156 A * | 4/1984 | Iwasaki et al. ................. 237/55 |
| 4,478,206 A * | 10/1984 | Ahn ............................... 126/99 A |
| 5,437,263 A * | 8/1995 | Ellingham et al. ......... 126/110 R |
| 2005/0039704 A1* | 2/2005 | Kobayashi et al. ............. 122/32 |
| 2006/0137678 A1* | 6/2006 | Tsunekawa et al. .......... 126/521 |
| 2008/0083404 A1* | 4/2008 | Rappold ....................... 126/524 |
| 2010/0025487 A1* | 2/2010 | Kaneiwa ......................... 237/53 |

FOREIGN PATENT DOCUMENTS

| | | | |
|---|---|---|---|
| DE | 29614890 U1 * | 10/1996 |
| JP | S49-126150 | 12/1974 |
| JP | 2000291948 A * | 10/2000 |
| JP | 2002089970 A * | 3/2002 |
| JP | 2006-183923 | 7/2006 |

* cited by examiner

*Primary Examiner* — Kang Hu
*Assistant Examiner* — Phillip E Decker
(74) *Attorney, Agent, or Firm* — Rankin, Hill & Clark LLP

(57) ABSTRACT

A vent hole 12 is provided in the upper part of a front panel 1e of an outer case 1. Air in a room having passed through a section in which a main heat exchanger 6 is arranged is led to the vent hole 12 through a space between an upper plate 1b of an outer case 1 and an upper wall 2d of a combustion housing 2. A drain dish 18 is arranged on the upper face of the upper wall 2d of the combustion housing 2.

3 Claims, 4 Drawing Sheets

FORCED DRAFT DIRECT VENT TYPE ROOM HEATER

BACKGROUND OF THE INVENTION

1. Field of the Invention

The present invention relates to a forced draft direct vent type room heater which forcibly supplies air for combustion and exhausts a combusted gas.

2. Description of the Related Art

Conventionally, such a room heater is known as is described in Japanese Patent No. 4050744. This room heater has a burner housed in a combustion housing provided in an outer case. In the combustion housing, air for combustion is supplied and a combusted gas is exhausted by a combustion fan. In an exhaust path for exhausting the combusted gas therethrough, a main heat exchanger is provided in the upstream side, and a supplementary heat exchanger is provided in the downstream side. In the outer case, an air intake and a vent hole are provided. In the outer case, a warm air fan is provided, and this warm air fan takes in room air from the air intake and sends the air to the inside of the room from the vent hole through the main heat exchanger and the supplementary heat exchanger.

The room heater also has the vent hole opened in the lower part of the front panel of the outer case, and leads the room air (warm air) having passed through the section in which the main heat exchanger is arranged to the vent hole through a space in the lower part of the combustion housing.

In addition, in such a room heater, the one is also known that has a drain dish arranged in the lower space of the combustion housing, and makes a drain (condensation water) formed in an exhaust extension tube (tube for exhausting exhaust gas to outside) which is connected to a downstream end of the exhaust path, to flow into the drain dish. In the above one, the drain which flowed into the drain dish is heated by a warm air flowing in the lower space of the combustion housing to be evaporated.

Here, in a weak combustion period, the temperature of the combusted gas flowing in the exhaust extension tube is lowered, and the amount of a formed drain increases, but the temperature of the warm air is lowered, so that an amount of an evaporated drain from the drain dish decreases. Accordingly, when the weak combustion is continued, the drain overflows from the drain dish. In order to prevent the overflow of the drain from the drain dish, it is necessary to shorten the length of the exhaust extension tube and to reduce the amount of the formed drain. As a result, a position where the room heater can be set becomes limited.

SUMMARY OF THE INVENTION

The present invention is designed with respect to the above described points, and its object is to provide a forced draft direct vent type room heater which can prevent the drain from overflowing from the drain dish even without shortening the length of the exhaust extension tube.

The present invention provides a forced draft direct vent type room heater comprising: an outer case, a combustion housing which is provided in the outer case and houses a burner therein, a combustion fan for forced draft direct ventilation, which is provided on the way of any one of an air supply path that supplies air for combustion to the combustion housing and an exhaust path that exhausts a combusted gas from the combustion housing, a main heat exchanger which is provided in the outer case so as to be positioned rearward of the combustion housing and is provided on the way of the exhaust path, an air intake and a vent hole which are opened in the outer case, a warm air fan in the outer case for taking in room air from the air intake and sending the air to the inside of the room from the vent hole through a section in which the main heat exchanger is arranged, and a drain dish which is provided in the outer case and makes a drain formed in an exhaust extension tube that is connected to a downstream end of the exhaust path to flow into the drain dish itself, wherein the vent hole is opened in the upper part of a front panel of the outer case, thereby the room air having passed through the section in which the main heat exchanger is arranged is led to the vent hole through a space between an upper plate of the outer case and an upper wall of the combustion housing, and the drain dish is arranged on an upper face of the upper wall of the combustion housing.

The room heater according to the present invention comprises the drain dish arranged on the upper wall of the combustion housing, so that a drain in the drain dish is heated by a heat transferred from the upper wall of the combustion housing, in addition to the room air (warm air) led to the vent hole through a space between the upper plate of the outer case and the upper wall of the combustion housing. Here, the temperature of the upper wall of the combustion housing considerably rises even in the weak combustion period, and the evaporation of the drain from the drain dish is promoted. Accordingly, the drain can be prevented from overflowing from the drain dish while continuing the weak combustion even without shortening the length of the exhaust extension tube.

The room heater according to the present invention also can inhibit the temperature of the upper wall of the combustion housing from excessively rising by the evaporation of the drain in a strong combustion period, and shows enhanced durability.

A user often warms herself or himself while sitting on a sofa or the like placed in front of a room heater. The room heater according to the present invention has the vent hole opened in the upper part of the front panel of the outer case, but can prevent the warm air from hitting the face of the user by setting a louver provided on the vent hole so as to face obliquely downward. On the other hand, when the vent hole is opened in the lower part of the front panel of the outer case as in a conventional example, and when the louver is set so as to face obliquely downward or horizontally, the warm air hits the floor surface and causes the overheat of the floor surface. For that reason, there is no other choice but to provide the louver so as to face obliquely upward, in order to prevent the floor surface from being overheated, and the warm air results in hitting the face of the user. Accordingly, the room heater according to the present invention, which has the vent hole opened in the upper part of the front panel of the outer case, is more advantageous for conducting comfortable heating while controlling the warm air so as not to hit the face.

In the present invention, it is desirable that a partitioning plate is provided which partitions a space between the upper plate of the outer case and the upper wall of the combustion housing into two of an upper room and a lower room, thereby, the room air having passed through the section in which the main heat exchanger is arranged is led to the vent hole through the lower room, a supplementary heat exchanger is arranged in the upper room, which is provided on the way of the exhaust path in a downstream side of the main heat exchanger, and thereby, one part of the room air taken in from the air intake is led to the vent hole through the upper room, without passing through the section in which the main heat exchanger is arranged.

Here, when the drain dish is arranged in the lower space of the combustion housing as in a conventional example, the drain dish is positioned in the lower part of the main heat exchanger, so that a drain formed in the inside of the main heat exchanger can be drained to the drain dish. On the other hand, in the present invention, the drain dish is arranged on the upper wall of the combustion housing, so that the drain formed from the main heat exchanger cannot be drained to the drain dish. Accordingly, it is necessary to set the heat exchange efficiency of the main heat exchanger at a low value, and to prevent the drain from being formed in the main heat exchanger. Otherwise, in this situation, the room heater results in showing poor heating efficiency. In this case, according to the above described structure, one part of the room air does not pass through the section in which the main heat exchanger is arranged but is passed to the upper room and is efficiently heated by the supplementary heat exchanger, so that even though the heat exchange efficiency of the main heat exchanger is set at the low value, heating efficiency is not lowered.

DETAILED DESCRIPTION OF THE PREFERRED EMBODIMENTS

Figure 1:
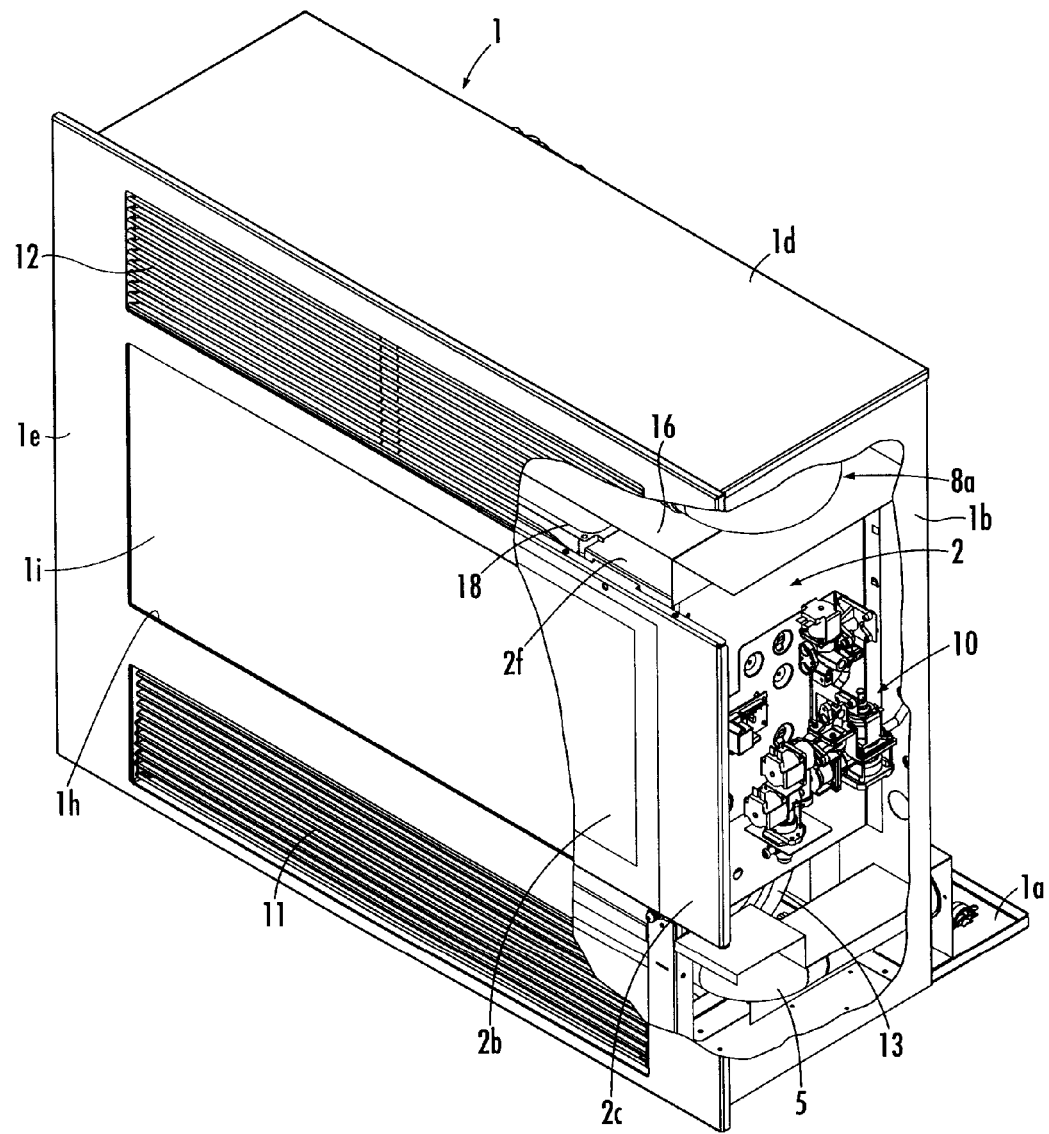
FIG. 1 is a perspective view of a room heater according to an embodiment of the present invention, which is viewed from an upper side in a diagonally front right direction.

The embodiment in which the present invention is applied to a fireplace type room heater will now be described below. This room heater comprises an outer case 1 and a combustion housing 2 which is provided in the outer case 1, as is illustrated in FIG. 1 to FIG. 4. The outer case 1 is constituted by a bottom plate 1a, right-and-left side plates 1b, a back plate 1c, an upper plate 1d, a front panel 1e, a first extension case 1f which is installed in a portion closer to one side of the back face of the back plate 1c, and a second extension case 1g which is installed from the other half side of the back face of the back plate 1c to the upper part of the first extension case 1f.

A burner 3 and a pilot burner 3a for igniting the burner 3 are arranged in the lower part of the inside of the combustion housing 2. In addition, a burner supporting plate 2a in which an opening for fitting the upper end part of the burner 3 is formed is arranged in the combustion housing 2, and a false firewood 4 which is formed from a refractory material such as ceramics is arranged on the burner supporting plate 2a. A glass plate 2b is fitted in a front face of the combustion housing 2, and a window 1h through which the glass plate 2b is overlooked is opened in the front panel 1e of the outer case 1. Thus, the inside of the combustion housing 2 can be viewed from the front of the front panel 1e, and when the burner 3 is burned, such an impression as if the false firewood 4 is really burning can be visually given.

The front panel 1e can also be formed so that the peripheral portion of the window 1h closely contacts the peripheral portion of the front face of the combustion housing 2, but incidentally in the present embodiment, the front panel 1e is arranged so that the window 1h is slightly separated from the front face of the combustion housing 2, and a window glass 1i is fitted in the window 1h. In addition, the above described glass plate 2b of the front face of the combustion housing 2 is fitted in the front door 2c which is provided on the front face of the main body of the combustion housing 2 so as to be freely opened and closed, and the burner 3 in the combustion housing 2 can be provided with maintenance in a state in which the front door 2c is opened. This front door 2c is supported by the combustion housing 2 at the lower end part tiltably in a forward and backward direction, and is pushed backward by pushing means 2e arranged on the upper wall 2d of the combustion housing 2 to closely contact the front face of the main body of the combustion housing 2. A cover 2f for covering the pushing means 2e from above is provided on the upper wall 2d of the combustion housing 2.

An air supply duct 5 which constitutes an air supply path is connected to the bottom face of the combustion housing 2. Outdoor air is supplied to the air supply duct 5 through an air supply extension tube which is not shown. The outdoor air is forcibly supplied into the combustion housing 2 through the air supply duct 5 by a suction force of a combustion fan 7 which will be described later.

In the outer case 1, a main heat exchanger 6 is arranged which is positioned in the back side of the combustion housing 2 and is provided on the way of an exhaust path for exhausting a combusted gas sent from the combustion housing 2. The main heat exchanger 6 is connected to the combustion housing 2 through a communication tube 6a. The combustion fan 7 for forced draft direct ventilation, which is arranged in the first extension case 1f, is provided on the way of the exhaust path. An exhaust duct 8 which is connected to the downstream side of the main heat exchanger 6 though the combustion fan 7 is inserted into the outer case 1 in a side space between the side plate 1b in one side in a transverse direction of the outer case 1 and the combustion housing 2.

In addition, a control substrate 9 is arranged in one side in a transverse direction of the lower part of the inside of the outer case 1, and a valve unit 10 for the burner 3 is arranged in a side space between the side plate 1b in the other side in a transverse direction of the outer case 1 and the combustion housing 2.

An air intake 11 is opened in the lower part of the front panel 1e of the outer case 1, and a vent hole 12 is opened in the upper part thereof. A warm air fan 13 that takes in room air from the air intake 11, passes the air through a section in which the main heat exchanger 6 is arranged and sends the air to the inside of the room from the vent hole 12 is arranged in the outer case 1, and thereby a warm air heating function can be obtained.

Figure 2:
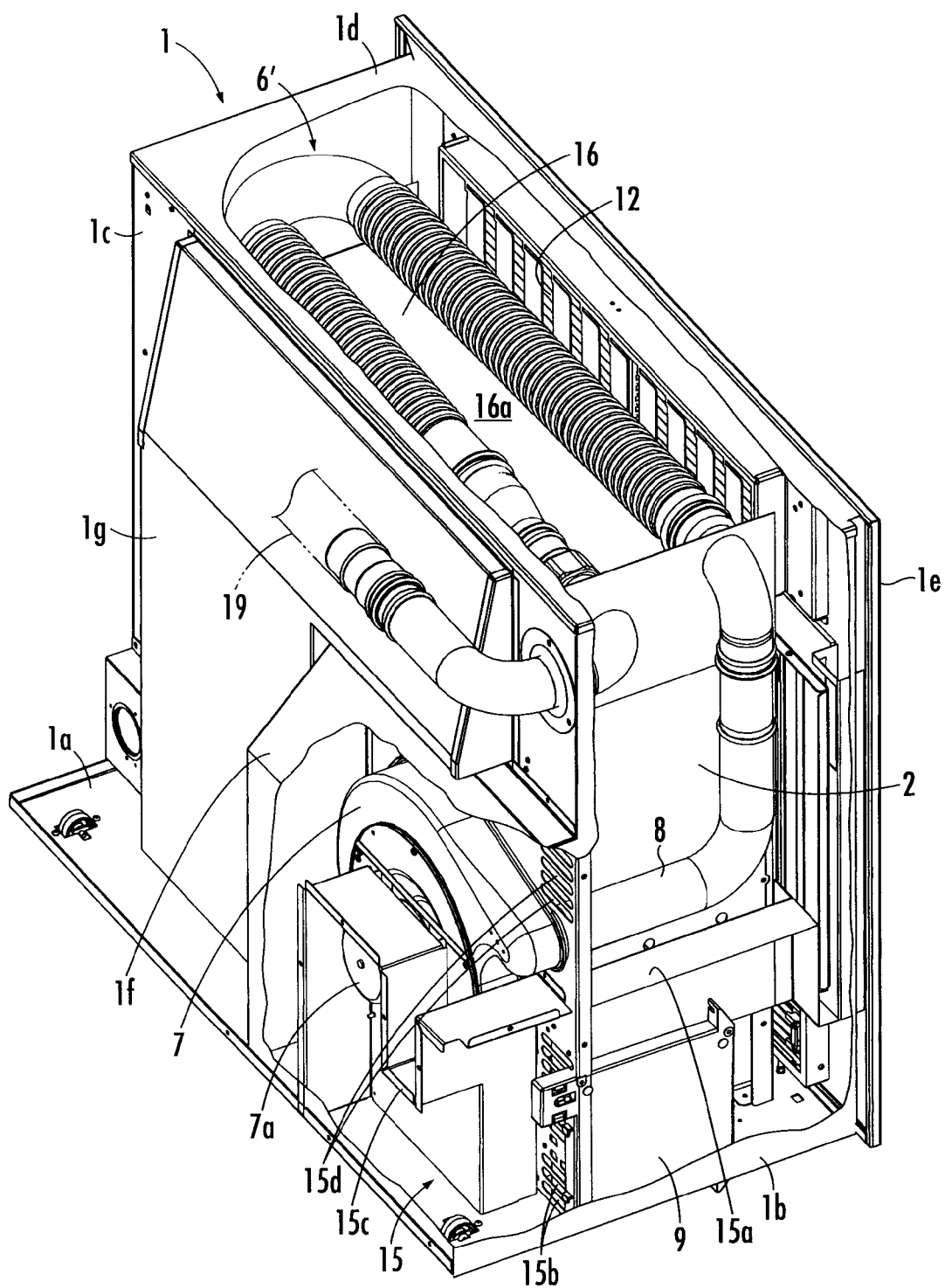
FIG. 2 is a perspective view of a room heater according to the embodiment, which is viewed from an upper side in a diagonally backside left direction.
Figure 3:
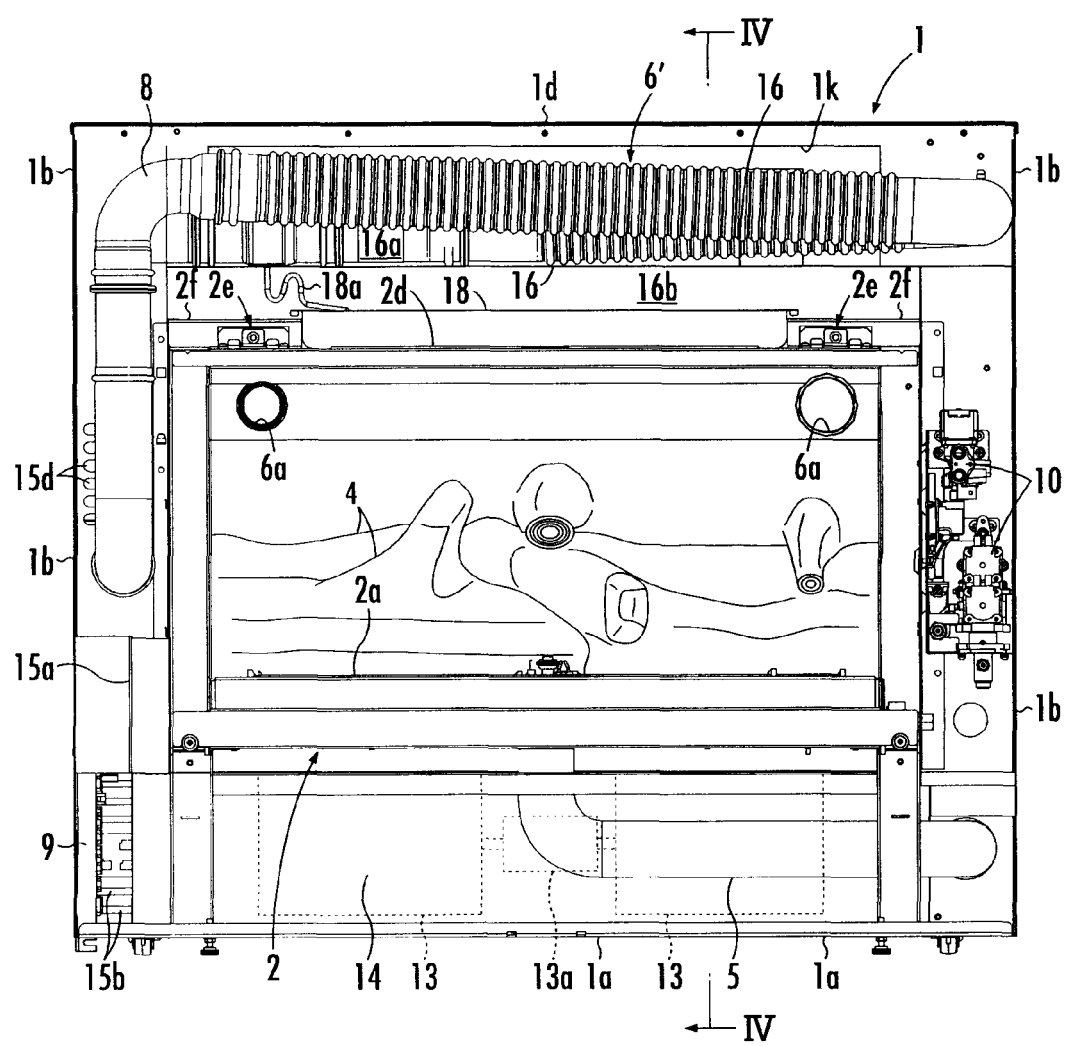
FIG. 3 is a front view illustrating a state in which a front panel and a front door of a combustion housing in the room heater according to the embodiment are removed.
Figure 4:
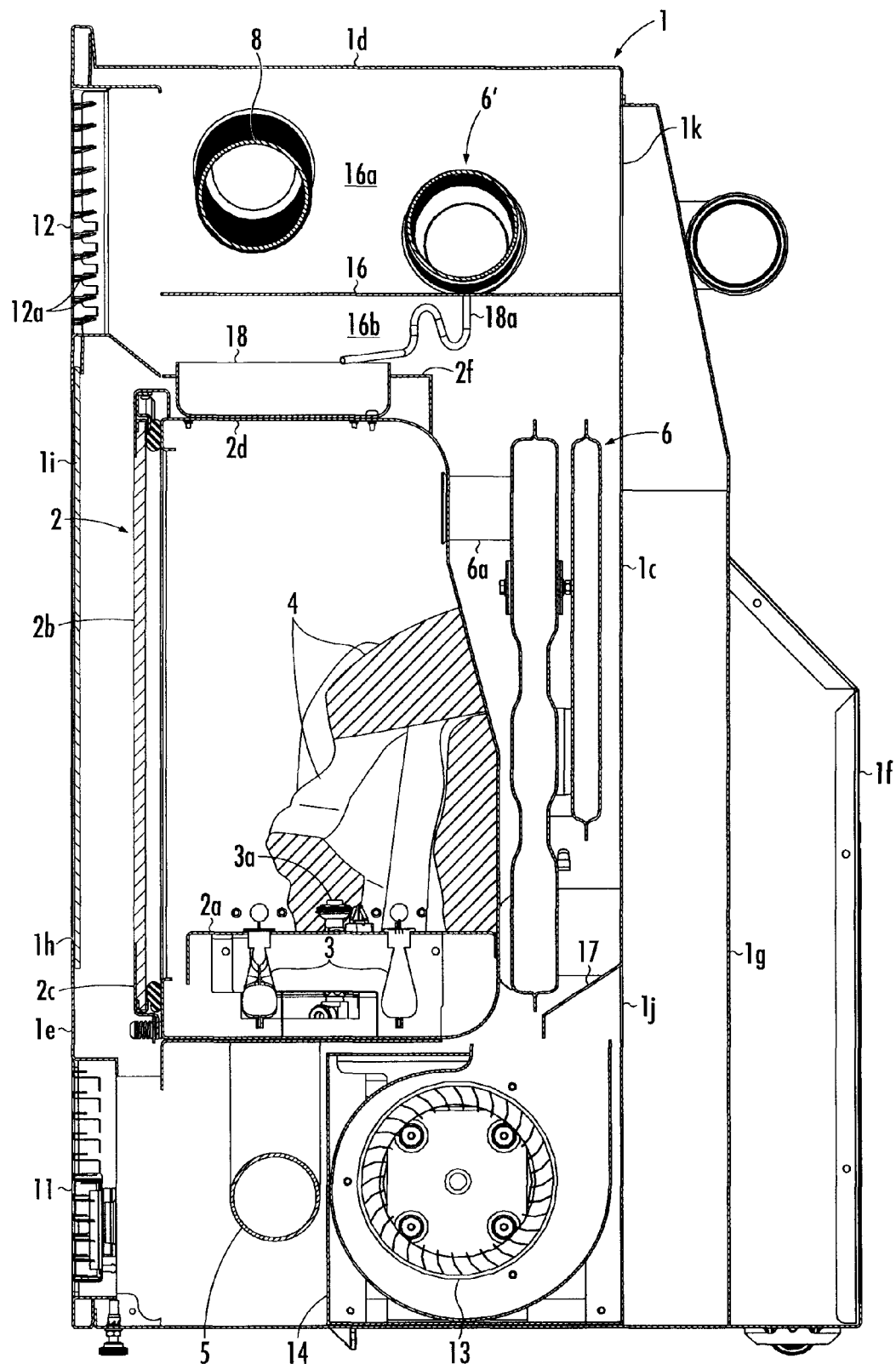
FIG. 4 is a sectional view taken along the line IV-IV of FIG. 3.

The warm air fan 13 is arranged in a horizontally long fan box 14 which is installed in the lower space of the combustion housing 2. The fan box 14 has openings in both side parts of itself in a transverse direction. As is illustrated in FIG. 2, a wind introduction path 15 is provided which leads one part of air taken in from the air intake 11 to an aperture in one side in a transverse direction of the fan box 14 through a section in which the control substrate 9 is arranged and a section in which a fan motor 7a for the combustion fan 7 is arranged. The wind introduction path 15 is constituted by: a first air guide plate 15a which surrounds the section in which the control substrate 9 is arranged from the inner side in the transverse direction to the upper side; a first air hole 15b which is formed in the back plate 1c of the outer case 1 so as to face a part surrounded by the first air guide plate 15a; a second air guide plate 15c placed in the first extension case 1f, which leads the air sent from the first air hole 15b to the section in which the fan motor 7a is arranged; and a second air hole 15d which is formed in the back plate 1c of the outer case 1 so as to be positioned above the first air guide plate 15a. Then, the air which is returned to the inside of the outer case 1 from the second air hole 15d is led to the aperture in one side in a transverse direction of the fan box 14 through a gap between the first air guide plate 15a and the side wall in one side in a transverse direction of the combustion housing 2.

A pair of the warm air fans 13 are provided with space therebetween in a transverse direction. A common fan motor 13a which drives both of the warm air fans 13 and 13 is arranged between both of the warm air fans 13 and 13.

The room air which is blown from the warm air fan 13 is led to the vent hole 12 through the section in which the main heat exchanger 6 is arranged, and a space between the upper plate 1d of the outer case 1 and the upper wall 2d of the combustion housing 2. Then, the room air is heated by the main heat exchanger 6 due to the heat exchange with the combusted gas, is heated to be a warm air, and is sent to the inside of the room from the vent hole 12. A louver 12a which is tilted obliquely downward is attached to the vent hole 12. Therefore, the warm air does not hit a face of a user who is warming oneself while sitting on a sofa or the like in front of a room heater.

Here, the space between the upper plate 1d of the outer case 1 and the upper wall 2d of the combustion housing 2 is partitioned into two rooms of an upper room 16a and a lower room 16b by a partitioning plate 16. The room air having passed through the section in which the main heat exchanger 6 is arranged is led to the vent hole 12 through the lower room 16b.

In the upper room 16a, a supplementary heat exchanger 6' is provided on the way of the exhaust path so as to be positioned in a downstream side of the main heat exchanger 6. The supplementary heat exchanger 6' is structured so as to meander in a U-shape the exhaust duct 8 in a transverse direction. The back plate 1c of the outer case 1 has a lower aperture 1j which makes one part of the room air blown from the warm air fan 13 flow into a second extension case 1g through a flow-dividing plate 17, and an upper aperture 1k which communicates a space in the second extension 1g to the upper room 16a. Thus, one part of the room air blown from the warm air fan 13 does not pass through the section in which the main heat exchanger 6 is arranged but is led to the vent hole 12 through the inside of the second extension case 1g and the upper room 16a.

In addition, a drain dish 18 is arranged on the upper face of the upper wall 2d of the combustion housing 2. A drain pipe 18a which leads to the drain dish 18 is branched from and connected to a part of the exhaust duct 8 which is the bottom-most part of the supplementary heat exchanger 6'. An exhaust extension tube 19 (see FIG. 2) for exhausting the combusted gas to the outdoors is connected to the downstream end (downstream end of exhaust path) of the exhaust duct 8. A drain formed in the exhaust extension tube 19 flows down to the exhaust duct 8, and flows into the drain dish 18 through the drain pipe 18a.

By the way, in the weak combustion period, the temperature of the combusted gas flowing in the exhaust extension tube 19 is lowered, and an amount of the formed drain increases. At this time, if the drain dish 18 is heated only by the warm air, an amount of a drain vaporizing from the drain dish 18 decreases, because the temperature of the warm air is lowered in the weak combustion period. Accordingly, when the weak combustion is continued, the drain overflows from the drain dish 18. In order to prevent the overflow of the drain from the drain dish 18, it is necessary to shorten the length of the exhaust extension tube 19 and to reduce the amount of the formed drain. As a result, a position where the room heater can be set becomes limited.

In contrast to this, in the present embodiment, the drain dish 18 is arranged on the upper wall 2d of the combustion housing 2, so that the drain dish 18 is heated not only by the warm air but also by a heat transferred from the upper wall 2d of the combustion housing 2. The temperature of the upper wall 2d of the combustion housing 2 becomes considerably high even in the weak combustion period, and the evaporation of the drain from the drain dish 18 is promoted. Accordingly, the drain can be prevented from overflowing from the drain dish 18 by continuing the weak combustion even without shortening the length of the exhaust extension tube 19. The room heater also can inhibit the temperature of the upper wall 2d of the combustion housing 2 from excessively rising with the evaporation of the drain in a strong combustion period, and shows enhanced durability.

Incidentally, if the drain dish 18 is arranged on the upper wall 2d of the combustion housing 2, the drain formed from the main heat exchanger 6 cannot be drained to the drain dish 18. Accordingly, it is necessary to set the heat exchange efficiency of the main heat exchanger 6 at a low value, and to prevent the drain from being formed in the main heat exchanger 6. Otherwise, in this situation, the room heater results in showing poor heating efficiency. However, in the present embodiment, the supplementary heat exchanger 6' is arranged in the upper room 16a as is described above, and one part of the room air does not pass through the main heat exchanger 6 but is led to the upper room 16a. Therefore, the air at a low temperature, which is not heated by the main heat exchanger 6, results in flowing into the section in which the supplementary heat exchanger 6' is arranged, and is efficiently heated by the supplementary heat exchanger 6'. Accordingly, even when the heat exchange efficiency of the main heat exchanger 6 is set at a low value, the heating efficiency does not decrease. In addition, even when the drain is formed in the supplementary heat exchanger 6', there is no problem because this drain flows into the drain dish 18 through the drain pipe 18a which is branched from and connected to the bottom part of the supplementary heat exchanger 6'.

In the above, the embodiment of the present invention is described with reference to the drawings, but the present invention is not limited to the embodiment. For instance, in the above described embodiment, the combustion fan 7 is provided on the way of the exhaust path, but the combustion fan can be provided on the way of the air supply path as well. In addition, in the above described embodiment, the air intake 11 is opened in the lower part of the front panel 1e of the outer case 1, but may be opened in each of the right and left side plates 1b of the outer case 1 as well. In addition, in the above described embodiment, the present invention is applied to a fireplace type of a forced draft direct vent type room heater, of which the inside of the combustion housing 2 can be viewed from the front of the front panel 1e, but can be also applied to a forced draft direct vent type room heater of which the inside of the combustion housing 2 cannot be viewed.

What is claimed is:
1. A forced draft direct vent type room heater comprising:
an outer case,
a combustion housing which is provided in the outer case and houses a burner therein,
a combustion fan for forced draft direct ventilation, which is provided on the way of any one of an air supply path that supplies air for combustion to the combustion hous- ing and an exhaust path that exhausts a combusted gas from the combustion housing, a main heat exchanger which is provided in the outer case so as to be positioned rearward of the combustion housing and is provided on the way of the exhaust path, an air intake and a vent hole which are opened in the outer case, a warm air fan in the outer case for taking in room air from the air intake and sending the air to the inside of the room from the vent hole through a section in which the main heat exchanger is arranged, and a drain dish which is provided in the outer case and makes a drain formed in an exhaust extension tube that is connected to a downstream end of the exhaust path to flow into the drain dish itself, wherein the vent hole is opened in an upper part of a front panel of the outer case, thereby the room air having passed through the section in which the main heat exchanger is arranged is led to the vent hole through a space between an upper plate of the outer case and an upper wall of the combustion housing, the drain dish is provided directly on an upper face of the upper wall of the combustion housing, a partitioning plate is provided so as to partition a space between the upper plate of the outer case and the upper wall of the combustion housing into two of an upper room and a lower room, thereby, the room air having passed through the section in which the main heat exchanger is arranged is led to the vent hole through the lower room, and a supplementary heat exchanger is arranged in the upper room, which is provided on the way of the exhaust path downstream from the main heat exchanger, and one part of the room air taken in from the air intake is led to the vent hole through the upper room, without passing through the section in which the main heat exchanger is arranged.

2. The forced draft direct vent type room heater according to claim 1, wherein the supplementary heat exchanger is spaced from the main heat exchanger.

3. The forced draft direct vent type room heater according to claim 1, wherein the drain dish is provided directly on an upper face of the upper wall of the combustion housing.

* * * * *